Dec. 25, 1945.  J. S. BURGE  2,391,679
APPARATUS FOR SUPPLYING WIRE FROM WIRE
SUPPLY SPOOLS TO BENDING PRESSES
Filed Feb. 23, 1942  7 Sheets-Sheet 3

INVENTOR
*James S. Burge*
BY
*Spencer Hardman & Fehr*
his ATTORNEYS

Patented Dec. 25, 1945

2,391,679

UNITED STATES PATENT OFFICE 2,391,679

APPARATUS FOR SUPPLYING WIRE FROM WIRE SUPPLY SPOOLS TO BENDING PRESSES

James S. Burge, Anderson, Ind., assignor to General Motors Corporation, Detroit, Mich., a corporation of Delaware Application February 23, 1942, Serial No. 431,984

5 Claims. (Cl. 140—126)

This invention relates to apparatus for supplying wire, which is carried by a supply spool, to a wire-bending press having a wire cut-off.

An object of the invention is to provide a durable intermittently - operating wire - feeder which will move into the press exactly the correct amount of wire to be cut off and formed. The durability of a wire-feeding mechanism is limited by the inertia to be overcome when starting and stopping moving parts of the mechanism. In connection with wire forming presses for making single turn armature conductors for engine starting electric motors, it has been the practice to use a wire feeder of the reciprocating type directly operated by the press crank-shaft. The moving parts of a reciprocating wire feeder for handling the amount of wire required for an armature conductor are necessarily large because the length of wire to be fed at each feeding stroke is substantial. Hence, the forces attendant upon starting and stopping and reversing the moving parts are great. I aim to obtain at least as positive a feed (without slipping) as has been obtained by reciprocating wire-feeders and also to obtain greater durability by the use of a plurality of pairs of power driven feed rollers of relatively small diameter between which the wire passes. The circumferences of the feed rolls are such that the correct amount of wire is fed when the rolls make one revolution. The rolls are power driven by means other than the wire bending press such means being preferably an electric motor. The rolls are connected with the motor by a one-revolution clutch which is tripped by means operated by the press. Each pair of rolls is individually positively stopped after exactly one revolution by stationary levers engaging notched discs connected with the rolls. The rolls, the stop discs, the one-revolution clutch and the connecting gear-trains between the clutch and rolls are relatively small in diameter and mass so that the polar inertia is relatively small. In this way, the shock of starting and stopping the rolls is relatively small and greater durability is thus obtained. The press operated clutch tripper has reciprocating parts; but these are small in mass since they are not subjected to large forces.

Further objects and advantages of the present invention will be apparent from the following description reference being had to the accompanying drawings wherein a preferred embodiment of the present invention is clearly shown.

Figure 1:
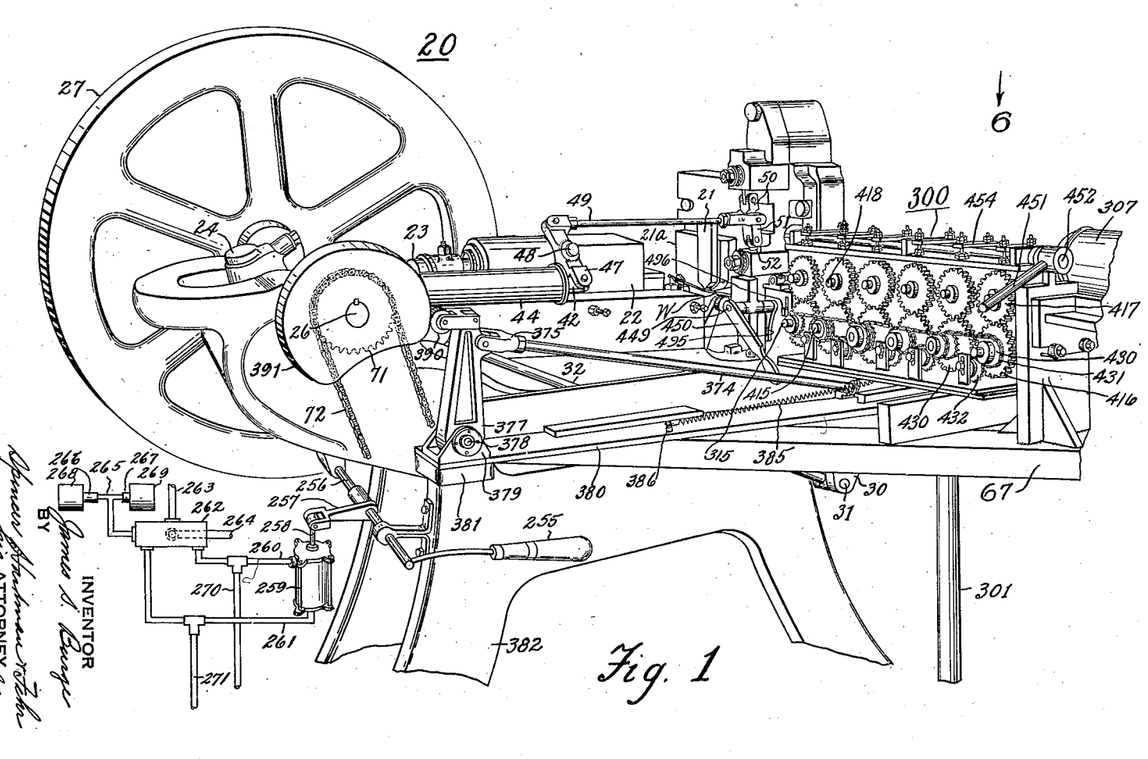
Figs. 1 and 2 taken together constitute a perspective view of an armature conductor forming press equipped with the wire unreeling and wire feeding devices of the present invention.
Figures 3, 4, 5:
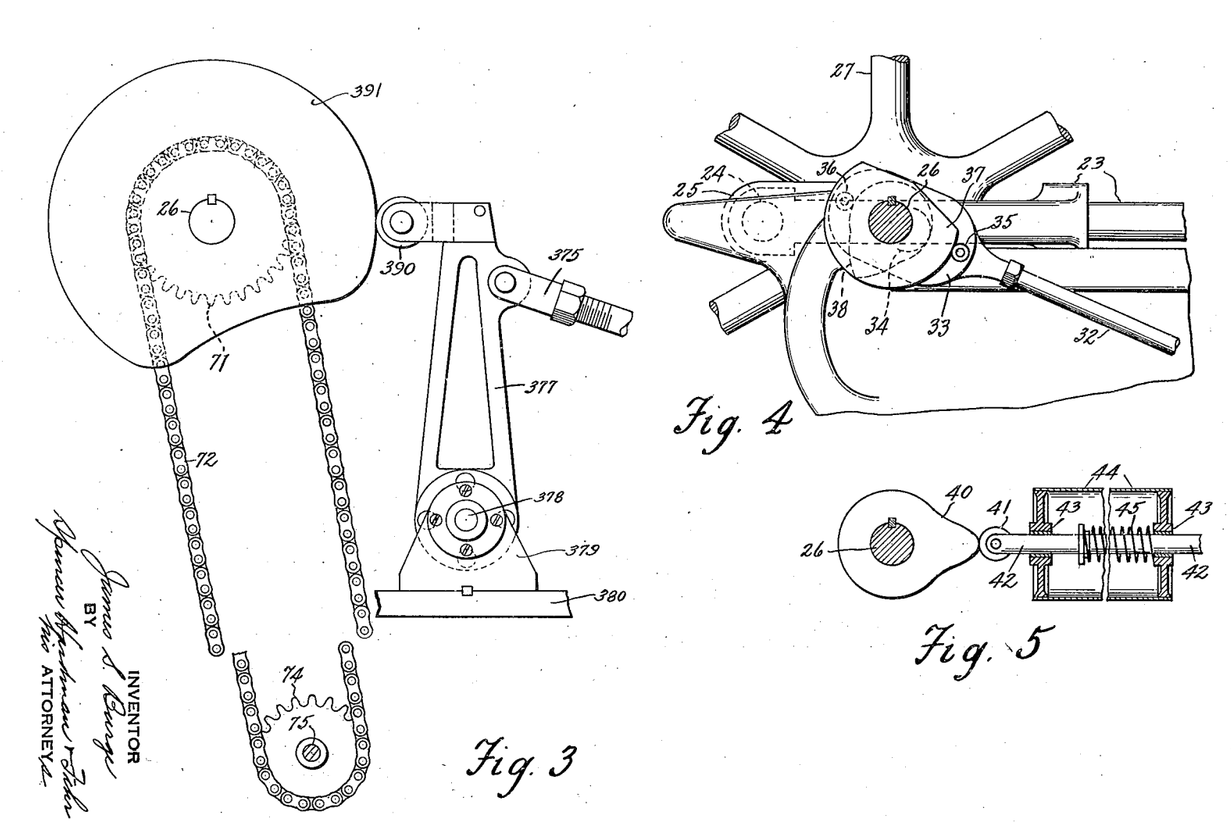
Fig. 3 is a fragmentary end view of a portion of the mechanism shown in Fig. 1.
Fig. 4 is a fragmentary view showing the press crank in its relation to cams for operating the hairpin yoke bending dies of the press.
Fig. 5 is a fragmentary view showing a portion of the mechanism for operating the cut off.

The wire bending press 20 shown in Fig. 1 bends lengths of wire into single turn armature conductors called hairpins. These hairpins are bent around a form 21, the yoke of the hairpins being bent around the lower end of the form and the legs being formed around the sides thereof. Two movable forming dies cooperate with the form 21, one being supported by a slide 22 connected by a rod 23 with a crank pin 24 on a crank 25 (Fig. 4) integral with a shaft 26 supporting a fly wheel and drive wheel 27 and connected therewith by a clutch not shown. The die within the slide 22 is given a horizontal movement. The die which cooperates with the lower edge of the form 21 is vertically movable, as shown in Poole Patent No. 1,834,733, by a mechanism including a bell crank lever 30 (Fig. 1) connected by a pin 31 with a rod 32 connected with a plate 33 (Fig. 4) having an elongated hole 34 through which the shaft 26 extends. Plate 33 carries rollers 35 and 36 engageable, respectively, with cams 37 and 38 driven by shaft 26. These cams are so timed with respect to the crank 25 that the vertically movable die member moves vertically upward to bend the hairpin around the lower edge of the form 21 before the horizontal movable die member carried by the slide 22 moves into engagement with the hairpin. The wire which has been fed across the front of the die support 21a and is cut off by a mechanism which is described and claimed in the copending application of Nichols and Fausset Patent No. 2,312,845 issued March 2, 1943. Said mechanism is operated by a cam 40 (Fig. 5) driven by shaft 26 cooperating with the roller 41 on a rod 42 which slides in bearings 43 provided by a tubular housing 44 supported by the machine. Housing 44 encloses a spring 45 bearing against a collar 46 thereby urging roller 41 always against the cam 40. As shown in Fig. 1, rod 42 is connected with a lever 47 pivoted at 48 on the machine and connected by a rod 49 with a pair of toggle links 50 and 51. A movement of rod 42 toward the right produced by the cam 40 as shown in Fig. 5 causes rod 49 to move toward the left in Fig. 1 to straighten the pair of toggle links 50 and 51 in order to cause a rod 52 to move downwardly to cause the wire W, being fed, to be cut off from the supply of wire.

Figure 2:
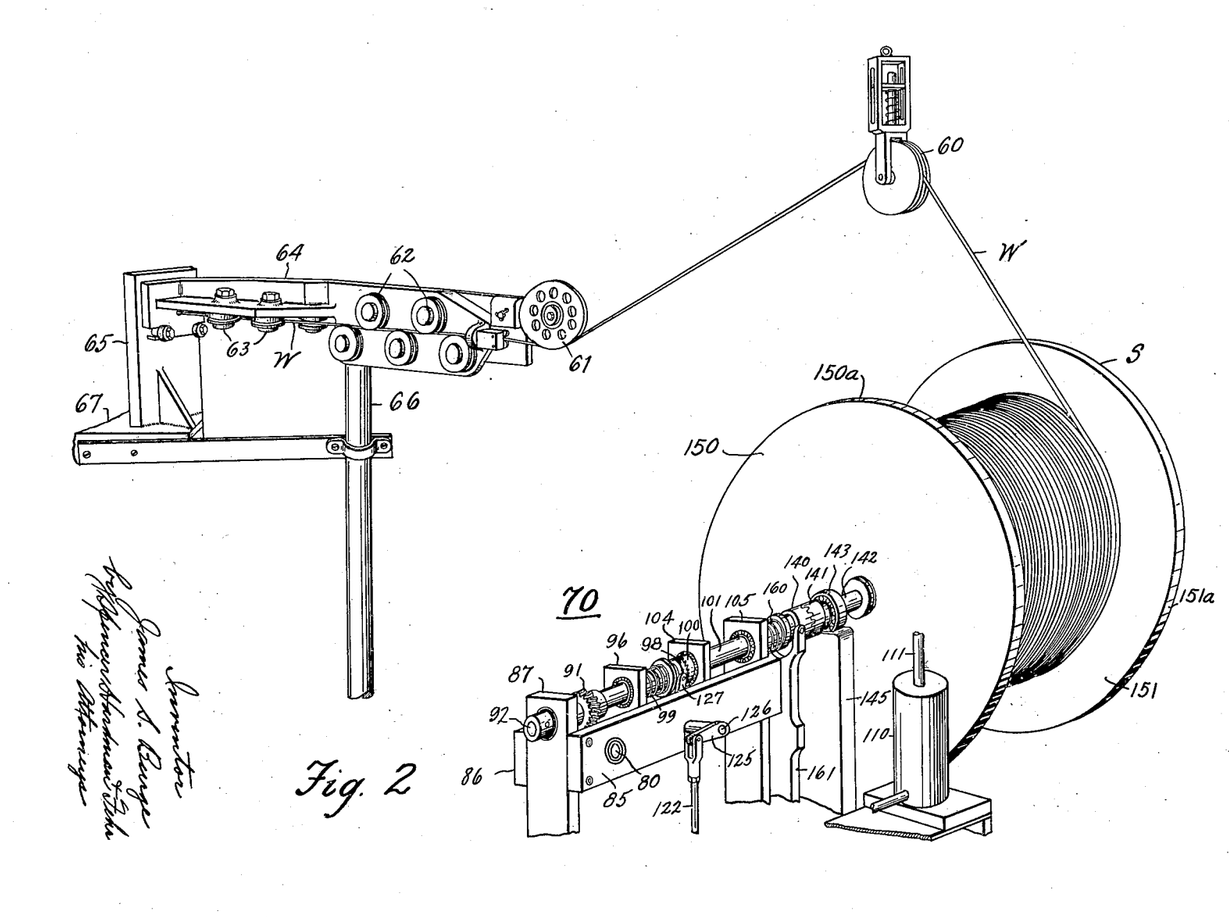

The wire which is formed into the hairpin conductor is positively fed by the mechanism 300, to be described. This mechanism receives the wire W from a supply spool S (Fig. 2). Wire W passes from the spool S around a flexibly supported pulley 60 and around a fixed pulley 61, between two ends of straightening rolls 62 and 63 carried on a bracket 64 supported by a bracket 65 and a post 66 which are attached to the frame 67 which extends from the frame of the forming press 20 as shown in Fig. 1.

The wire unreeling mechanism designated by numeral 70 in Fig. 2 is described in detail and is claimed in my copending divisional application Serial No. 562,137, filed November 6, 1944. For the proper understanding of the wire feeding mechanism 300 which is claimed in this application, it will be sufficient to state that said wire unreeling mechanism 70 is operated by the forming press shaft 26 which, as shown in Fig. 1, drives the sprocket 71 engaging a chain 72. Fig. 3 shows chain 72 engaging a sprocket 74 which drives a shaft 75. By means (not shown) the shaft 75 is connected with a shaft, the end of which is shown at 80 in Fig. 2. The shaft 80 is journalled in bearings carried by plates 85 and 86 which are supported by posts 87 and 105. The shaft 80 is connected with a shaft 92 by gears, one of which is shown at 91. Shaft 92 is journalled in bearings carried by post 87 and a plate 96. In alignment with the shaft 92, there is a shaft 101 rotatably supported by plate 104 and post 105. The shaft 92 may be connected with shaft 101 or disconnected therefrom through a clutch having parts 98 and 100 urged into engagement by spring 99. The clutch part 98 may be retracted from clutch part 100 by lever 127 attached in any suitable manner to a shaft 126 carrying a lever 125 operated by a link 122. The link 122 is operatively connected with a piston rod 111 in any suitable manner (not shown). The rod 111 is attached to a piston (not shown) in a cylinder 110 which receives fluid pressure in a manner to be described.

The wire spool S is mounted on a shaft 142, the ends of which are journalled in bearings 143 supported by the pedestals 76 shown at 145. When the spool S is placed in proper unreeling position with the bearings 143 received by suitable recesses provided by the upper ends of the pedestals 145, the shaft 142 will be placed in alignment with the shaft 101. A driving connection between these shafts is provided by clutch members 140 and 141 attached respectively to the shafts 101 and 142. A spring 160 urges the clutch member 140 (longitudinally splined to the shaft 101) into engagement with the clutch member 141. The disengagement of the member 140 from the member 141 is effected by the manipulation of a member 161.

As disclosed in my copending divisional application referred to, the peripheral surfaces 150a and 151a of the spool flanges 150 and 151 respectively provide brake drums for engagement by a braking member (not shown). A relatively small amount of braking pressure is normally applied to the spool while wire is being unreeled therefrom by the operation of the feeding mechanism 300. When the forming press 20 is stopped, the servo motor provided by the cylinder 110 and rod 111 operates to disengage the clutch parts 98 and 100 and also to increase the braking pressure upon the peripheries of the spool flanges. Control of the application of fluid pressure to the cylinder 110 (Fig. 2) is shown in Fig. 1. The clutch (not shown) for connecting the press driving wheel 27 with its crank shaft 26 can be controlled manually by lever 255 which rotates a shaft 256, or the shaft 256 may be automatically controlled by an arm 257 connected with a piston rod 258 connected with a piston (not shown) in cylinder 259. The ends of cylinder 259 are connected respectively by pipes 260 and 261 with a valve 262 having a pressure fluid inlet pipe 263 and an exhaust or drain pipe 264. Valve 262 is controlled by a rod 265 connected with solenoid armatures 266 and 267 attracted respectively by solenoids 268 and 269. When solenoid 268 alone is energized, valve 262 is caused to connect pipe 263 with pipe 260 to cause shaft 256 to turn counterclockwise to control the press clutch for stopping the press when die carrier 22 is in the position shown in Fig. 1. When solenoid 269 alone is energized, the valve 262 is conditioned for causing clockwise rotation of shaft 256 to close the press clutch. When the press is stopped as the result of passing pressure fluid to pipe 260, pressure fluid flows also through pipe 270 to the upper end of cylinder 110 (Fig. 2) to cause rod 111 to move down and to cause the clutch part 98 to be disengaged from the clutch part 100. Rotation of shaft 101 ceases, but the press shaft 26 may rotate to outer-deadcenter position at which position the press clutch disengages. When the press is started to operate as the result of admitting pressure fluid to pipe 261, pressure fluid passes through pipe 271 to the lower end of cylinder 110 (Fig. 2) to cause rod 111 to move up to effect the engagement of clutch parts 98 and 100 thereby connecting the shaft 142 with shaft 92 which rotates while the press shaft 26 is rotating. As disclosed in my copending divisional application, after the piston rod 111 has moved up in response to the control which effects the starting of the forming press, the braking pressure applied to the peripheries of the spool flanges is the normal pressure required to prevent undue slack in the wire W. When the rod 111 has moved down in response to the control which effects the stopping of the forming press, an additional braking pressure is applied to the flanges of the spool S so that the spool will be stopped when the press is stopped and so that no wire will be unreeled until the press starts again. However, when threading the wire through the feeder 300 it is possible to relieve the extra braking pressure upon the spool independently of the manipulation of clutch control lever 255 (Fig. 1) by means disclosed in my copending divisional application.

Figure 9:
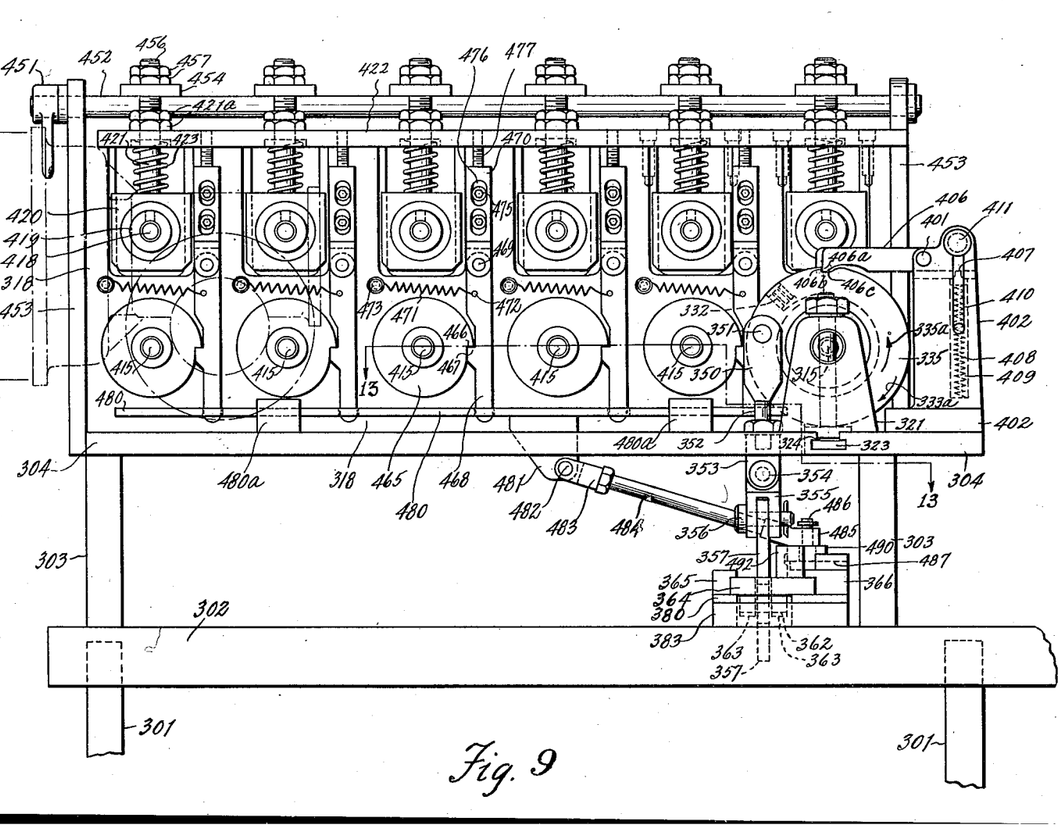
Fig. 9 is a view in the direction of the arrow 9 of Fig. 6.
Figures 10, 11:
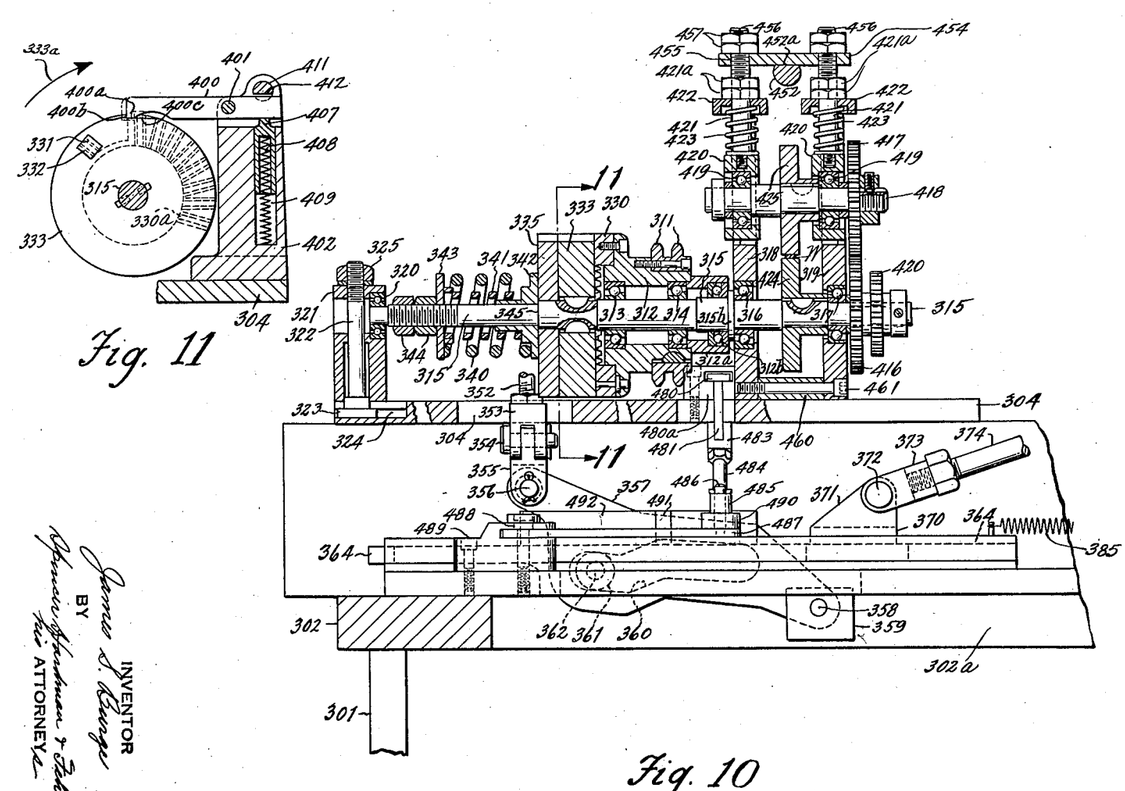
Fig. 10 is a sectional view on line 10—10 of Fig. 6.
Fig. 11 is a sectional view on line 11—11 of Fig. 10.

Referring to Fig. 9 posts 301 support a table 302 which supports plates 303 which support base 304. Base 304 supports a frame 305 (Fig. 6) providing a case 306 for enclosing speed reducing gears connecting an electric motor 307 with a shaft 308 driving sprocket gears 309 connected by chains 310 with sprocket gears 311. Referring to Fig. 10, gears 311 are secured to a drum 312 supported on bearings 313 and 314, the inner races of which are carried by a shaft 315 the right end portion of which is supported by bearings 316 and 317 mounted in frame side-plates 318 and 319. The left end of the shaft 315 is supported by bearing 320 mounted in a frame 321 through which extends a bolt 322 having a square head 323 reecived by a T-slot 324 in the plate 304. Bolt 322 receives a nut 325 which, when loosened, permits adjustment of the frame 321 axially of the shaft 315. When the frame 321 has been adjusted to the proper location, it is clamped in position by tightening the nut 325.

Figures 6, 7, 8:
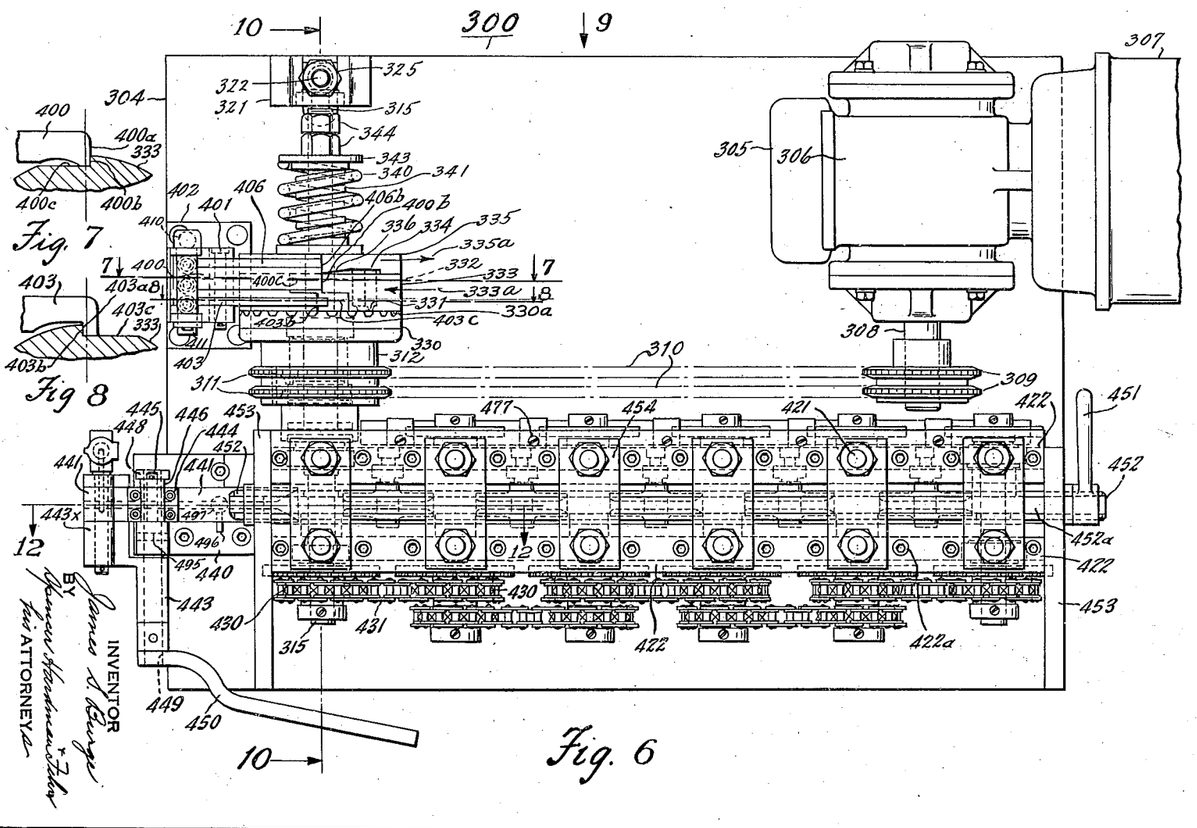
Fig. 6 is a plan view of the wire feeding mechanism in the direction of the arrow 6, of Fig. 1.
Figs. 7 and 8 are fragmentary sectional views taken respectively on lines 7—7 and 8—8 of Fig. 6.

The drum 312 carries a ring 330 having notches 330a (Fig. 11) adapted to be engaged by the tooth 331 of a square block 332 mounted in disc 333 which is keyed to shaft 315. Ring 330 constitutes a power-operated clutch driving-member loosely supported by the shaft 315, and disc 333 with the block 332 constitutes a clutch driven-member fixed to the shaft 315. Normally the flat end of the block 332 as shown in Fig. 6 is received by a recess backed by a plane wall 334 in a clutch control disc 335. The plane wall 334 merges with an inclined wall 336 so that, when the disc 335 rotates in the direction of the arrow 335a (opposite to the direction of rotation of the clutch), the block 332 will be forced downward as viewed in Fig. 6, so that the tooth 331 engages the notches in disc 330, thereby connecting the disc 333 with the notched ring 330 and thereby connecting the power driven drum 312 with the shaft 315 to cause rotation of disc 333 in the direction of the arrow 333a. By means to be described later the clutch control disc 335 is rotated in the direction of the arrow 335a.

When the drum 312 is connected with the disc 333 by means of the bar 332, there is a reaction between the inclined surfaces defining the notches 330a of disc 330 and the inclined surfaces of the tooth 331 in a direction tending to move the bar 332 backward against the surface 336 of the disc 335. This reaction is opposed by springs 340 and 341 which are located between a collar 342 and a washer 343 confined by nuts 344 adjustable along a threaded portion of the shaft 315. These springs may urge the collar 342 against a shoulder 345 of the shaft 315 and no further toward the right in Fig. 10. When collar 342 rests against shoulder 345 there is clearance between the collar 342 and disc 335 sufficient to allow freedom of rotation of the disc 335. When disc 335 has been moved, so that its camming surfaces 336 engage the bar 332, the disc 335 tends to move toward the left in Fig. 10 and it engages the collar 342 so that further tendency of the disc 335 to move toward the left is opposed by the springs 340 and 341.

As shown in Fig. 9, the disc 335 is rotated counter-clockwise as indicated by arrow 335a by means of a mechanism comprising a link 350 connected with the disc 335 by a pin 351 and having a threaded shank 352 which is screwed into a clevis 353 connected by a pin 354 with a clevis 355 connected by a pin 356 with a plate 357 which is pivotally supported at 358 (Fig. 10) by a bracket 359 carried by the table 302 having an opening at 302a. The lever 357 is moved by the coaction of surfaces of a cam slot 360 provided in the lever 357 with a horizontally reciprocating roller 361 which is journalled on a pin 362. Pin 362 is supported by ears 363 (Fig. 9) depending from a sliding plate 364 which is guided for horizontal sliding movement by ways 365 and 366. The plate 364 is provided with an elongated opening 367 (Fig. 13) for receiving the lever 357. The plate 364 carries a bracket 370 having an apertured ear 371 connected by pin 372 with a clevis 373 adjustably secured to a rod 374, as shown in Figs. 1 and 3, rod 374 is connected with a clevis 375 connected by a pin 376 with a lever 377 pivotally supported at 378 by a bracket 379 which is carried by the bar 380, one end of which is mounted on a pad 381 of the forming press frame 382. The other end of the bar 380 is located between the two plates 365 and 366 and a block 383 supported by the table 302 (Fig. 9). A spring 385 is attached at one end to the sliding bar 364 (Fig. 10) and at the other end of a stud 386 (Fig. 1) attached to bar 380. This spring urges bar 364 toward the right in Fig. 10 or toward the left in Fig. 1 and thus urges the lever 377 toward the left, and likewise a cam follower roller 390 pivotally supported by the lever 377 against a cam 391 driven by machine shaft 26. Cam 391 coacts with roller 390 to cause the reciprocations of the bar 364 which in turn cause the vertical movements of the lever 357 through the coaction between the roller 361 and surfaces of the cam slot 360.

As the machine is shown in Fig. 1, the operation of the feeding mechanism 300 has been completed. As the cam 391 continues to rotate in a clockwise direction, the feed 300 remains stationary while the wire W is being formed into a hairpin or single bar conductor. Following the forming operation, it is ejected and the forming dies are ready to receive another length of wire to be formed. Before the movable die carrier 22 returns to its position as shown in Fig. 1 most remote from the fixed die 21, the cam 391 will have caused a reciprocation of the bar 364 first toward the right from the position shown in Fig. 10 and then back again to that position. As the roller 361 moves toward the right (Fig. 10) relative to the lever 357, lever 357 is caused to move downwardly, thereby causing, through the various connecting parts 355, 353, 352, 351, the rotation of the clutch controlling disc 335 in a counterclockwise direction as indicated by arrow 335a in Figs. 6 and 9. This causes the electric motor 307 to be connected with the shaft 315 while the shaft 315 makes one revolution. Before shaft 315 has made one revolution, the complete reciprocation of the bar 364 will have taken place so that disc 335 will have been returned to its normal position so that its surface 334 is ready to receive the bar 332 the moment rotation of the disc 333 is arrested.

The stopping of the disc 333 at the end of one revolution, in the direction of arrow 333a (Fig. 6), which is clockwise as indicated by arrow 333a in Fig. 9, is effected by a wide stop lever 400 pivotally supported on a pin 401 carried by bracket 402 supported by platform 304. Lever 400 has a stop surface 400a (Fig. 7) engaging the stop surface 400b of a notch 400c provided in disc 333. To prevent rebounding of the disc 333 away from the surface 400a of the lever 400 in the effort to stop rotation of disc 333, the disc 333 is provided with another notch 403c (Fig. 8) defined by stop surface 403b adapted to engage the hooked end 403a of a lever 403 also pivotally supported by pin 401. Pin 401 pivotally supports a third lever 406 having a hooked end surface 406a (Fig. 9) for engaging a notch-surface 406b of a notch 406c of disc 335. As viewed in Figs. 9 and 11, each of the levers 400, 403, 406 is urged counterclockwise by plunger 407 urged upwardly by a spring 408, said plunger and spring each being housed in a recess 409 provided by the bracket 402. The levers 400, 403, 406 may be retracted from engagement with the discs 333 and 335 by turning a handle 410 attached to a shaft 411 which has a flat 412 for engaging these levers in order to cam them in a clockwise direction when the handle is turned. This is done when it is desired to remove the clutch parts from shaft 315.

When disc 335 is rotated counterclockwise in the direction of arrow 335a (Fig. 9) in order to cause the bar 332 to connect disc 333 with ring 330 the notched surface 406c engages hooked end 406a of lever 406 to move the same upwardly. The end of lever 400 is received also by notch 406c of disc 335; therefore when disc 335 is rotated to trip the clutch, lever 400 will be retracted from disc 333 to permit the same to rotate in a clockwise direction as indicated by arrow 333a in Figs. 6 and 11. It is apparent that the levers 400 and 403 cooperate with the disc 333 positively to stop it after it has made one revolution and the lever 406 positively stops the clockwise movement of the disc 335 as viewed in Fig. 9. Lever 406 is slightly longer than lever 400 so as to insure that lever 400 will drop into notch 406c when lever 406 strikes stop surface 406b of disc 335.

The shaft 315 drives a plurality of shafts 415 (Fig. 9) having axes all on the same horizontal level with the shaft 315; and each of the shafts 415 drives a gear 416 (Fig. 10) meshing with a gear 417 for driving a shaft 418. Each shaft 418 is journalled in bearings 419 mounted in bearing blocks 420 which are guided for vertical sliding movement by the frames 318 and 319. Each bearing block 420 is secured to a rod 421 passing through a bar 422 supported by the frames 318 and 319. Springs 423 are each located between a bar 422 and a bearing block 420 in order to urge a shaft 418 downwardly, thereby urging a wire feed wheel 425 driven by a shaft 418 toward a feed wheel 424 driven by shaft 315 or by one of the shafts 415, the wire W being clamped between the lower row of feed wheels 424 and the upper row of feed wheels 425. The diameters of the feed wheels 424 and 425 are the same and are such that when these wheels have made one revolution the correct length of wire for forming a hairpin conductor will be fed to the forming press 20. The driving connections between shaft 315 and between each pair of adjacent shafts 415 comprise sprocket gears 430 arranged in pairs and connected by chains 431 which pass over idler sprockets 432 (Fig. 1).

Figures 12, 13:
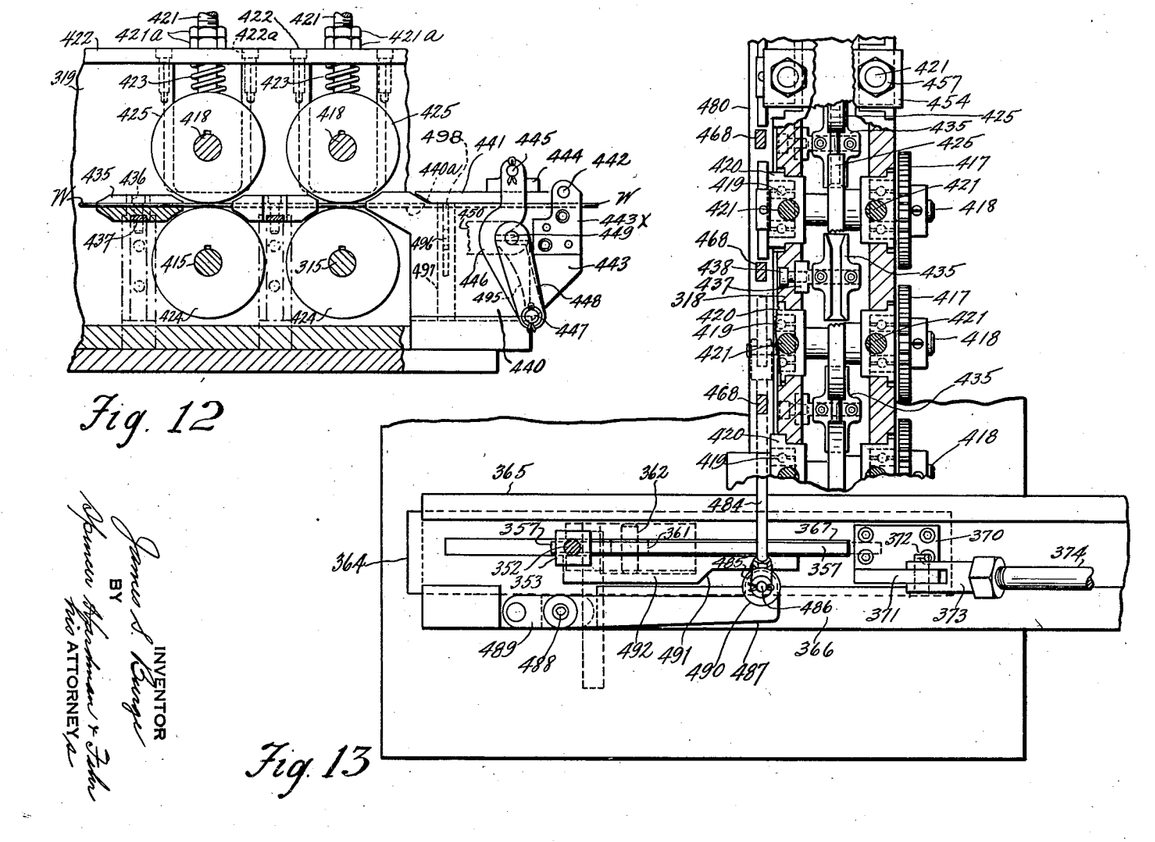
Fig. 12 is a fragmentary sectional view on the line 12—12 of Fig. 6.
Fig. 13 is a fragmentary sectional view on line 13—13 of Fig. 9.

Referring to Fig. 12, between the pairs of rolls 424 and 425 the wire is guided by grooved guide blocks 435 attached by screws 436 to brackets 437 which are attached by screws 438 (Fig. 13) to frame 318. From the end pair of feed rolls 424 and 425 which are supported by shafts 315 and 419, the wire W passes to the bending press 20 along a grooved supporting bracket 440 upon which a plate 441 may be held in order to prevent upward movement of the wire. Plate 441 is pivoted at 442 upon a bracket 443 attached to bracket 440. Plate 441 carries a bracket 444 connected by pin 445 with link 446 connected by pin 447 with lever arm 448 connected with shaft 449 connected with handle 450. By turning handle 450 in one direction such as clockwise in Fig. 12 the plate 441 is caused to move clockwise about its pivot 442 in order to provide access to the wire receiving channel 440a of bracket 440. Shaft 449 (Figs. 1 and 12) carries an arm 495 for engaging a pin 496 (Fig. 6) connected with a knock out pin 497 which projects into the wire receiving channel 440 when the plate 441 is lifted in order to eject a short length of wire W whose right end is in the forming press 20 and whose left end is out of engagement with the right end pair of rolls 424, 425 (Fig. 12). This enables the operator to grasp a short length of wire and to remove it from the press before starting to feed a new supply of wire to the feed-rolls.

Before feeding the wire between the feed rolls and along the channel brackets 435 and 440 the upper feed rolls 425 must first be separated from the lower feed rolls 424. This is accomplished by turning a handle 451 (Fig. 6) attached to a shaft 452 journalled in frame end plates 453 and having a flat 452a (Fig. 10) for engaging bars 454 connected as shown in Fig. 10 with pairs of rods 421. Each bar 454 is provided with plain holes 455 receiving the upper threaded ends 456 of the rods 421 which receive nuts 457 for engaging the upper surfaces of the bars 454.

Bars 422 are secured to the frame side plates 318 and 319 by screws 422a (Fig. 12). The side plates 318 and 319 are secured to a bottom plate 460 by screws 461 (Fig. 10) and the bottom plate 460 is secured to the platform 304. The end plates 453 (Fig. 6) are fastened to the side plates 318 and 319 by screws (not shown).

Each shaft 415 is provided with an individual rotation stopping means which stops each shaft 415 at the end of one revolution just as shaft 315 is stopped after making one revolution by the engagement of levers 400 and 403 with the disc 333. For this purpose each shaft 415 (Fig. 9) carries a disc 465 having a stop lug 466 for engaging the lug 467 of a lever 468 pivoted at 469 to a vertically adjustable block 470 and urged clockwise with respect to its pivot 469 by a spring 471 connected by a pin 472 with lever 468 and by stud 473 with frame 318. In order to bring the stop lugs 467 into the proper location with respect to the disc 465, each bracket 470 may be vertically adjusted by loosening screws 475 which are threaded into the frame 318 and have their heads each received by a counterbored oblong recess 476 in the bracket 470. The bracket 470 is moved upwardly against a stop screw 477 threaded into a bar 422. Screw 477 can be turned in order to adjust the limit of upward vertical movement. When bracket 470 has been located by the assistance of the stop screw 477, it is then secured in place by tightening the screws 475. It is apparent that each lever 468 cooperates with a disc 465 in order to limit rotation of disc 465 to exactly one revolution in a clockwise direction as viewed in Fig. 9.

Before the next revolution of the shafts 415 can be started, it is necessary to retract the levers 468 from the disc 465. This is accomplished by movement to the right of a bar 480 which is apertured to receive each of the levers 468 and which is provided with a depending bracket 481 connected by pin 482, clevis 483, rod 484, rod end 485, pin 486 with a lever 487 (Fig. 13) pivoted at 488 upon bracket 489 attached to bar 366. Lever 487 carries a roller 490 for engaging a cam 491 provided by a bar 492 fixed to the bar 364. When bar 364 moves toward the right, the cam 491 engages the roller 490 in order to effect clockwise movement of lever 487 for the retraction of the levers 468 from the discs 465 before shaft 315 is connected with the power driven drum 312.

It will be noted that the rotating parts of the wire-feeder 300 are relatively small and hence low in mass. Their polar inertia is therefore low; hence the forces set up during starting and stopping are relatively low. Furthermore, each pair of feed rolls is individually stopped so that the forces attendant upon stopping are distributed. Therefore the wire feeder 300 is subjected to very slight wear and its life is relatively long.

The apparatus is used in the following manner: Before threading the wire from a full spool S, which has been placed in unreeling position in the manner described, the press 20 is stopped by causing the solenoid 268 to be energized by closing a suitable switch (not shown). For safety and economy, the power drive (not shown) of the fly-wheel pulley 27 should be rendered inoperative. The clutch parts 140 and 141 are separated and the additional braking pressure is relieved so that the wire W can be pulled from the spool S and be fed between the rolls of feeder 300, the upper feed rolls 425 having first been separated from the lower feed rolls 424 by moving the handle 451 upwardly from the position shown in Fig. 1. Handle 450 is also moved upwardly to expose the channel 440a of bracket 440 (Fig. 12) so that a short end of wire left over from the supply of wire from the preceding spool may be removed. The wire is threaded into the press 20. Handles 450 and 451 are returned to normal position. The clutch parts 140 and 141 are caused to become engaged. The power drive of the press flywheel pulley 27 is restored to operation, the feed operating motor 307 is started and the press starting solenoid 269 is caused to be energized by closing a suitable switch, not shown. The press shaft 26 then operates to drive the unreeler shaft 142 which drives the spool S so that unreeling of the wire takes place continuously as long as shaft 26 is rotating. The press shaft 26 operates to trip the clutch of the feeder 300 so that wire will be fed between the press forming dies while they are separated. As the wire starts into motion, it is not jerked from the spool since a slack portion has been provided between the spool and the feeder, said slack portion passing over the resiliently supported roll 60 (Fig. 2). After the wire is fed between the dies of the bending press, the press shaft 26 operates to cut the wire and to form it into a hairpin for use as a single turn armature conductor. The slack in the wire between the unreeler and feeder is restored during the idle status of the feeder while the unreeler is being continuously driven by the press shaft.

While the embodiment of the present invention as herein disclosed, constitutes a preferred form, it is to be understood that other forms might be adopted, all coming within the scope of the claims which follow.

What is claimed is as follows:

1. In apparatus for supplying wire from a wire supply-spool to a bending press having an operating shaft, the combination comprising the press operating shaft, means for rotatably supporting the supply-spool, means operated by the press operating shaft for rotating the spool to unreel the wire, means for feeding the wire comprising a plurality of pairs of feed rolls by which the wire is gripped, a power operated driving clutch member, a driven clutch member connected with the feed rolls, means for causing the clutch members to be connected for one revolution, means for individually stopping the pairs of feed rolls at the end of one revolution, and means operated by the press operating shaft for effecting momentary retraction of the feed roll stopping means and for effecting the operation of the means which causes the clutch members to be connected for one revolution.

2. In apparatus for supplying wire from a wire supply-spool to a bending press having an operating shaft, the combination comprising the press operating shaft, a plurality of pairs of feed rolls by which the wire is gripped, a second shaft connected with the rolls and supporting one of them, a power operated driving clutch member journalled on said second shaft and having a notch, a driven clutch disc supported by the second shaft and connected therewith, a driven clutch bar carried by the driven disc and supported thereby for movement parallel to the second shaft into and out of engagement with the notch of the driving clutch member, a clutch-control-disc supported by the second shaft and having a recess for receiving an end of the bar when out of engagement with the driving-clutch-member and having a cam surface for engaging said end of the bar to cause said bar to engage the notch of the driving-clutch-member when the control disc is rotated oppositely to the rotation of the second shaft when driving the rolls, means for individually stopping rotation of the pairs of rolls at the end of one revolution, and means operated by the press operating shaft for momentarily retracting the roll-stopping-means and for effecting an oscillation of the control disc first in the direction opposite to rotation of the second shaft and then return.

3. In apparatus for supplying wire from a wire supply-spool to a bending press having an operating shaft, the combination as defined by claim 2 further characterized in that the means for stopping one of the pairs of rolls comprises a stop lever, a stop surface engaged by the lever and defined by a notch in the periphery of the driven clutch-bar-carrying disc, and in that the control disc is provided with means for engaging the stop lever to retract it from the stop surface of the clutch-bar-carrying disc during rotation of the control disc in the direction opposite to rotation of the driven shaft.

4. In apparatus for supplying wire from a wire supply-spool to a bending press having an operating shaft, the combination comprising the press operating shaft, a plurality of pairs of feed rolls by which the wire is gripped, a power operated driving clutch member, a driven clutch member, means for causing the clutch members to be connected for one revolution means for individually stopping the pairs of feed rolls at the end of one revolution and comprising rotating stop lugs each connected with a pair of rolls and stop levers each for engaging a stop lug and springs each for urging a stop lever into the path of movement of a stop lug, and means operated by the press shaft for effecting momentary retraction of the stop levers and for effecting the operation of the means which causes the clutch members to be connected for one revolution.

5. In apparatus for supplying wire from a wire supply-spool to a bending press having an operating shaft, the combination comprising the press operating shaft, a plurality of pairs of feed rolls by which the wire is gripped, a second shaft connected with the rolls and supporting one of them, a power operated driving clutch member journalled on said shaft and having a notch, a driven disc supported by the shaft and connected therewith, a driven clutch bar carried by the driven disc and supported thereby for movement parallel to the second shaft into and out of engagement with the notch of the driving clutch member, a clutch-control-disc supported by the second shaft and having a recess for receiving the bar when out of engagement with the driving-clutch-member and having a cam surface for engaging the bar to cause it to engage the notch of the driving-clutch-member when the control disc is rotated oppositely to the rotation of the shaft when driving the rolls, means for stopping that pair of rolls one of which is supported by the driven shaft and comprising a stop lever and a stop lug engaged by the lever and defined by a notch in the periphery of the clutch-bar-carrying disc, means providing by the control disc for engaging said stop lever to retract it from the stop lug of the clutch-bar-carrying disc during rotation of the control disc in the direction opposite to rotation of the driven shaft, means for individually stopping rotation of the other pairs of rolls at the end of one revolution and comprising notched discs providing stop lugs, each disc being connected with a pair of rolls, and comprising stop levers each for engaging a stop lug and comprising springs each for urging a lever into the path of movement of a stop lug, cam-operated means for retracting all of the last mentioned levers simultaneously from the path of movement of the last mentioned stop lugs, cam operated means for effecting an oscillation of the control disc first in the direction opposite to the rotation of the driven shaft and then in return direction, a reciprocating bar carrying cams which operate respectively the two cam operated means recited, and means operated by the press-shaft for moving said bar.

JAMES S. BURGE.